United States Patent [19]

Ishikawa et al.

[11] Patent Number: 4,913,005

[45] Date of Patent: Apr. 3, 1990

[54] METHOD OF CONTROLLING SPEED REDUCTION RATIO FOR A CONTINUOUSLY VARIABLE SPEED TRANSMISSION

[75] Inventors: Yoshikazu Ishikawa; Kouji Yamaguchi, both of Saitama; Koji Sasajima, Tokyo, all of Japan

[73] Assignee: Honda Giken Kogyo Kabushiki Kaisha, Tokyo, Japan

[21] Appl. No.: 259,867

[22] Filed: Oct. 19, 1988

[30] Foreign Application Priority Data

Oct. 20, 1987 [JP] Japan .................................. 62-264839

[51] Int. Cl.⁴ ............................................. B60K 47/12
[52] U.S. Cl. ...................................... 74/866; 74/867
[58] Field of Search .......................... 74/866, 867, 865

[56] References Cited

U.S. PATENT DOCUMENTS

| | | | |
|---|---|---|---|
| 4,589,302 | 5/1986 | Oda | 74/866 |
| 4,612,828 | 9/1986 | Ide | 74/866 |
| 4,641,553 | 2/1987 | Kobayashi | 74/866 |
| 4,653,006 | 3/1987 | Osanai et al. | 74/866 X |
| 4,663,990 | 5/1987 | Itoh et al. | 74/866 |
| 4,680,990 | 7/1987 | Ohgami | 74/868 |
| 4,700,590 | 10/1987 | Omitsu | 74/857 |
| 4,701,853 | 10/1987 | Osanai | 364/424.1 |
| 4,704,683 | 11/1987 | Osanai | 74/866 X |
| 4,713,987 | 12/1987 | Matsumura | 74/866 |
| 4,730,518 | 3/1988 | Miyawaki | 74/866 |
| 4,730,523 | 3/1988 | Takahashi | 74/868 |
| 4,767,382 | 8/1988 | Tezuka et al. | 74/866 X |
| 4,776,233 | 10/1988 | Kita et al. | 74/866 X |
| 4,782,934 | 11/1988 | Takano | 192/0.073 |
| 4,793,217 | 12/1988 | Morisawa | 74/866 |
| 4,803,900 | 2/1989 | Ohkumo | 74/866 |

FOREIGN PATENT DOCUMENTS

0217221  4/1987  European Pat. Off. .
0240178  10/1987  European Pat. Off. .
62-237164  10/1987  Japan .

Primary Examiner—Dwight G. Diehl
Attorney, Agent, or Firm—Lyon & Lyon

[57] ABSTRACT

The speed reduction ratio of a continuously variable speed transmission on a motor vehicle is controlled by continuously varying the speed reduction ratio in a range between a maximum speed reduction ratio and a minimum speed reduction ratio. A top limit speed reduction ratio corresponding to a speed of the motor vehicle and being higher than the minimium speed reduction ratio is set in a low vehicle speed range. The speed reduction ratio is controlled only between the maximum speed reduction ratio and the top limit speed reduction ratio in the low vehicle speed range.

8 Claims, 5 Drawing Sheets

METHOD OF CONTROLLING SPEED REDUCTION RATIO FOR A CONTINUOUSLY VARIABLE SPEED TRANSMISSION

BACKGROUND OF THE INVENTION

The present invention relates to a method of controlling the speed reduction ratio in a continuously variable speed transmission for use in a motor vehicle.

One known method of controlling the speed reduction ratio of a continuously variable speed transmission mounted on a motor vehicle to control the running of the motor vehicle is disclosed, for example, in Japanese Laid-Open Patent Publication No. 62(1987)-237164. According to the known control method, a reference engine speed is preset according to an opening of a throttle valve of the engine of the motor vehicle, and the rotational speed of the engine is controlled so as to match with the reference engine speed.

In controlling the engine speed to cause the engine speed to correspond with the reference engine speed, a speed reduction ratio is controlled to be as small as possible (toward a top position). This controlling method yields improved fuel economy and a lower engine speed for the same vehicle speed, which in turn allows the vehicle to run quietly.

In order to increase the engine speed when the accelerator pedal of the motor vehicle is depressed for acceleration, a rate of change of the speed reduction ratio, which corresponds to the reciprocal (1/V) of the vehicle speed is required (as described in detail later on). Therefore, when accelerating the vehicle at a lower vehicle speed, the increase in the engine speed tends to be slower than when accelerating the vehicle at a higher vehicle speed, with the result that the engine is apt to suffer knocking, and the power available from the transmission is not large enough.

SUMMARY OF THE INVENTION

In view of the aforesaid drawbacks, it is an object of the present invention to provide a method of controlling the speed reduction ratio of a continuously variable speed transmission on a motor vehicle while allowing an engine rotational speed to increase quickly even when accelerating the motor vehicle at a lower vehicle speed.

To achieve the above object, according to the present invention, a top limit speed reduction ratio which corresponds to a speed of the motor vehicle and which is higher than a minimum speed reduction ratio is set in a low vehicle speed range. The speed reduction ratio is controlled only between a maximum speed reduction ratio and the top limit speed reduction ratio in the low vehicle speed range. In a vehicle speed range higher than the low vehicle speed range, the speed reduction ratio is controlled between a minimum speed reduction ratio and a maximum speed reduction ratio.

In the low vehicle speed range, the speed reduction ratio is not reduced to be smaller than the top limit speed reduction ratio, which top limit speed reduction ratio is greater than the minimum speed reduction ratio. Therefore, it is possible to quickly increase the engine speed when accelerating the motor vehicle in a low vehicle speed range in which a relatively large rate of change of the speed reduction ratio is required and an increase in the engine speed upon acceleration would otherwise tend to be slow.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given below and the accompanying drawings which are given by way of illustration only, and thus are not limitative of the scope of the present invention, and wherein.

DESCRIPTION OF THE PREFERRED EMBODIMENT

Figure 1:
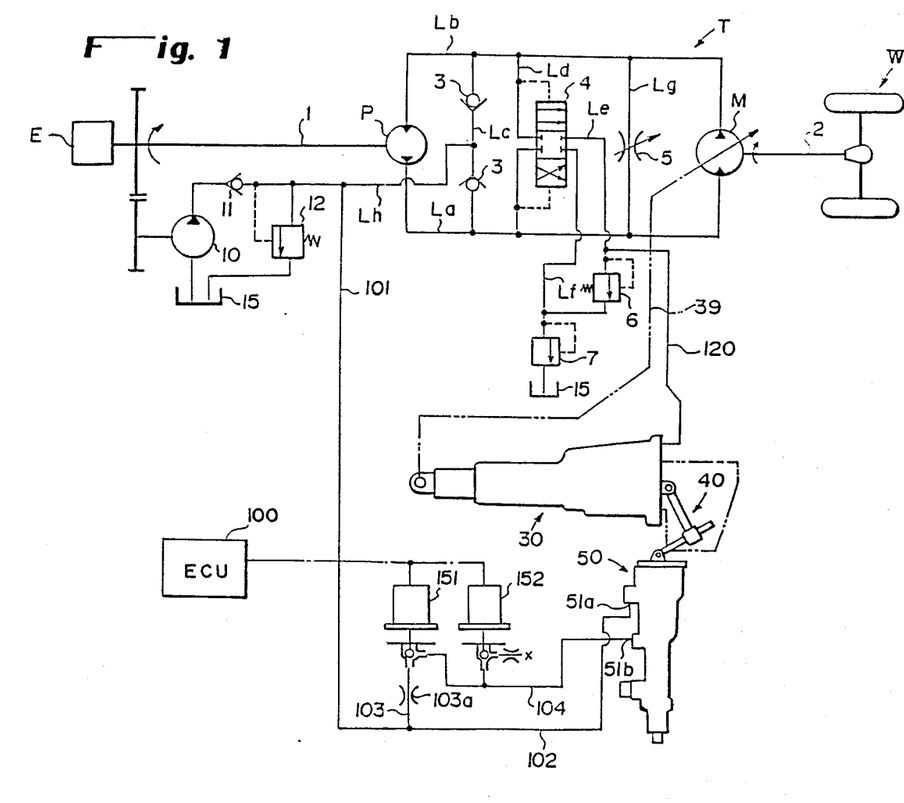
FIG. 1 is a hydraulic circuit diagram of a continuously variable speed transmission, the speed reduction ratio of which is controlled by a method according to the present invention.

FIG. 1 shows a hydraulic circuit of a continuously variable speed transmission, the speed reduction ratio of which is controlled by a method of the present invention. The continuously variable speed transmission, generally indicated by T, has a hydraulic pump P of the fixed displacement type which is drivable by an engine E through an input shaft 1 and a hydraulic motor M of the variable displacement type which has an output shaft 2 for driving wheels W. The hydraulic pump P and the hydraulic motor M are hydraulically coupled to each other by a closed hydraulic circuit having a first hydraulic passage or line La communicating with the outlet port of the pump P and the inlet port of the motor M, and second hydraulic line Lb communicating with the inlet port of the pump P and the outlet port of the motor M.

A charging pump 10 drivable by the engine E has an outlet port connected to the closed hydraulic circuit through a charging hydraulic line Lh having a check valve 11 and a third hydraulic line Lc having a pair of check valves 3. Working oil which is drawn from an oil sump 15 by the charging pump 10 and regulated in its pressure by a charging pressure relief valve 12 is supplied to a lower-pressure one of the hydraulic lines La, Lb through the action of the check valves 3. To the closed hydraulic circuit, there is also connected a fourth hydraulic line Ld having a shuttle valve 4 coupled to fifth and sixth hydraulic passages, or lines Le, Lf, that have high and low pressure relief valves 6, 7 connected, respectively to the oil sump 15. The shuttle valve 4 comprises a two port three-position directional control valve which is operable in response to the difference between hydraulic pressure in the first and second hydraulic lines La, Lb for communicating the lower-pressure line with the sixth hydraulic line Lf. The relief pressure from the higher-pressure hydraulic line is regulated by the higher-pressure relief valve 6, and the relief pressure from the lower-pressure hydraulic line is regulated by the lower-pressure relief valve 7.

Between the first and second hydraulic lines La, Lb, there is connected a seventh hydraulic line Lg providing a short circuit therebetween, the seventh hydraulic line Lg having a clutch valve 5 comprising a variable restrictor for controlling the opening of the seventh hydraulic line Lg under the control of a valve control unit (not shown). Therefore, the transmission of driving power from the hydraulic pump P to the hydraulic motor M can be controlled by controlling the clutch valve 5.

The displacement of the hydraulic motor M is controlled to control the speed reduction ratio of the continuously variable speed transmission T by an actuator comprising first and second ratio control servo units 30, 50 which are operatively interconnected by a link mechanism 40. The hydraulic motor M comprises a swash-plate axial-piston motor with its displacement controllable by controlling the angle of inclination of the swash plate with the ratio control servo units 30, 50.

Operation of the ratio control servo units 30, 50 is controlled by solenoid valves 151, 152, the duty cycle of which is controlled by a signal from a controller 100. The controller 100 is supplied with signals respectively representing a vehicle speed V, an engine rotational speed Ne, a throttle valve opening $\theta$th, a swash plate angle $\theta$tr of the hydraulic motor M, and an opening (or depression) $\theta$acc of the accelerator pedal of the motor vehicle which is operated by the driver. Based on the supplied signals, the controller 100 produces a control signal to control the solenoid valves 151, 152 for achieving a desired running mode or condition for the motor vehicle.

Figure 2:
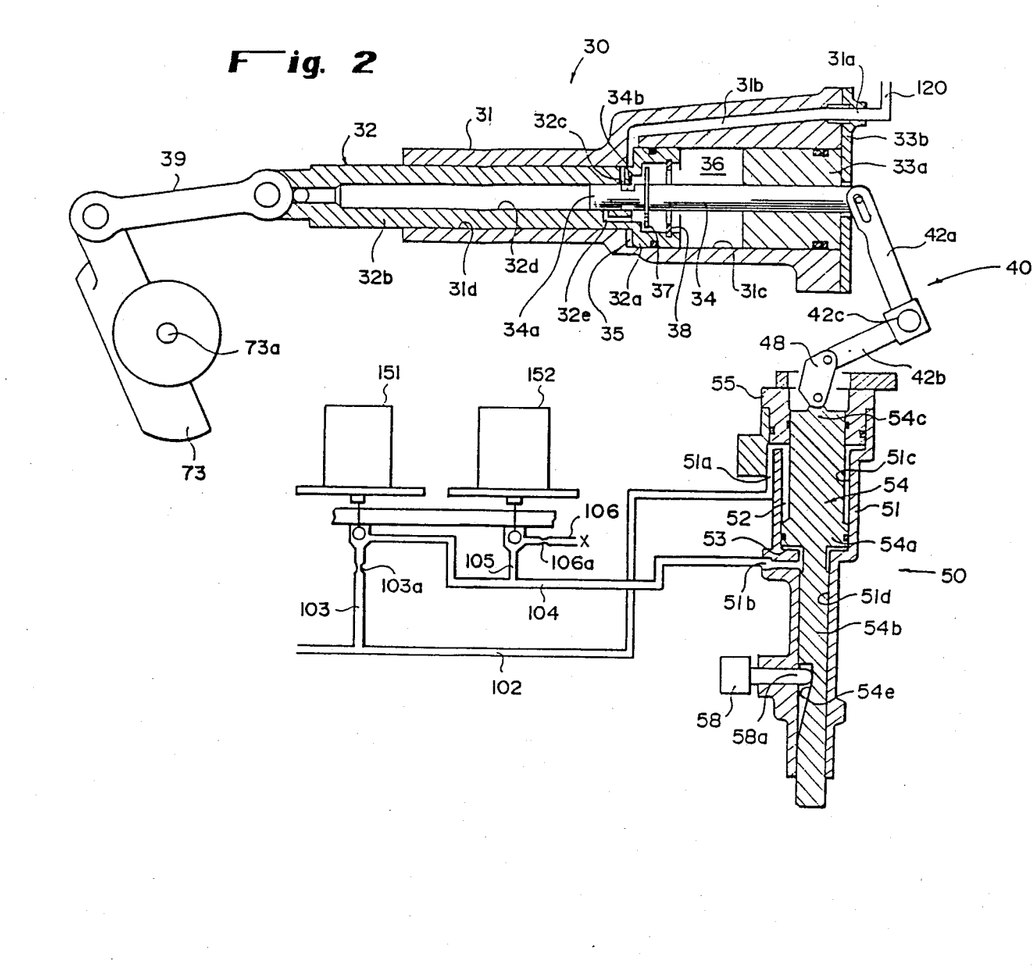
FIG. 2 is a cross-sectional view of first and second ratio control servo units.

The structure and operation of the servo units 30, 50 will be described below with reference to FIG. 2.

The first ratio control servo unit 30 controls the angel of the swash plate of the hydraulic motor M under a higher hydraulic pressure introduced via a high-pressure line 120 branched off the fifth hydraulic line Le from the closed circuit of the continuously variable speed transmission T through the shuttle valve 4. The second ratio control servo unit 50 is operatively coupled to the first ratio control servo unit 30 through the link mechanism 40 for controlling the operation of the servo unit 30.

The first ratio control servo unit 30 has a housing 31 having a connector port 31a to which the high-pressure line 120 is connected, a piston 32 horizontally (as shown) slidably fitted in the housing 31, and a spool 34 slidably fitted coaxially in the piston 32. The piston 32 comprises a piston member 32a of its righthand end, and a cylindrical rod member 32b extending coaxially from the piston member 32a to the left (as shown in FIG. 2). The piston member 32a is fitted in a cylinder bore 31c defined in the housing 31, dividing the cylinder bore 31c into two lefthand and righthand (as shown in FIG. 2) cylinder chambers 35, 36. The rod member 32b is slidably fitted in a rod bore 31d which is defined coaxially with the cylinder bore 31.3 and smaller in diameter than the cylinder bore 31c. The righthand cylinder chamber 35 is closed off by a plug 33a and a cover 33b, through which the spool 34 extends.

The lefthand cylinder chamber 35 is held in communication with the high-pressure line 120 through a hydraulic passage 31b. The piston 32 is therefore pushed to the right under the hydraulic pressure introduced from the high-pressure line 120 into the lefthand cylinder chamber 35.

The spool 34 has on its inner distal end a land 34a snugly fitted in a spool bore 32d defined coaxially in the rod member 32b. The spool 34 also has a pair of diametrically opposite recesses 34b defined therein on the righthand side of the land 34 and having prescribed axial dimensions. A stop ring 37 is fixedly fitted over the spool 34 rightwardly of the recesses 34b. The land 34a is prevented from moving out of the spool bore 32d by the stop ring 37 which engages a stop ring 38 secured to the inner peripheral surface of the piston member 32a.

The piston 32 has a discharge passage 32e defined therein for venting the righthand cylinder chamber 36 through the spool bore 32d to the oil sump (not shown in FIG. 2) when the spool 34 is moved to the right, and a communication passage 32c defined therein for communicating the righthand cylinder chamber 36 with the lefthand cylinder chamber 35 through the recesses 34b upon rightward movement of the spool 34.

By moving the spool 34 to the right from the illustrated position, the land 34a closes the communication passage 32c and opens the discharge passage 32e. Therefore, oil under pressure flowing from the high-pressure line 120 via the hydraulic passage 31b acts in only the lefthand cylinder chamber 35 to move the piston 32 to the right in synchronism with the spool 34.

When the spool 34 is moved to the left, the recesses 34b bring the communication passage 32c into communication with the righthand cylinder chamber 36, and the land 34a closes the discharge passage 32e. Consequently, the high-pressure oil acts in both the lefthand and righthand cylinder chambers 35, 36. Because the piston member 32a has different pressure-bearing areas facing into the lefthand and righthand cylinder chambers 35, 36, the piston 32 is moved to the left in synchronism with the spool 34.

When the spool 32 is stopped somewhere in its stroke, the piston 32 is also stopped in a hydraulically balanced condition due to the balanced pressures in the lefthand and righthand cylinder chambers 35, 36.

By moving the spool 34 to the left or the right, the piston 32 can be moved in synchronism with the spool 34 under the high hydraulic pressure introduced from the high-pressure line 120. As a consequence, the swash plate, indicated by Mt(73), of the hydraulic motor M which is operatively coupled to the piston 32 through a link 39 can be angularly moved about a shaft Ms(73a) to variably control the displacement of the motor M.

The spool 34 is operatively connected to the second ratio control servo unit 50 through the link mechanism 40. The link mechanism 40 comprises a first link member 42 having two arms 42a, 42b angularly movable about a shaft 42c and extending substantially perpendicularly to each other, and a second link member 48 pivotally coupled to the distal end of the arm 42b of the first link member 42b. The upper end of the arm 42a is pivotally connected to the righthand end of the spool 34 of the first ratio control servo unit 30. The lower end of the second link member 48 is pivotally coupled to a spool 54 of the second ratio control servo unit 50. When the spool 54 is moved vertically (FIG. 2), therefore, the spool 34 of the first ratio control servo unit 30 is moved horizontally.

The second ratio control servo unit 50 comprises a housing 51 having ports 51a, 51b to which two respective hydraulic lines 102, 104 are connected, and the spool 54 vertically slidably fitted in the housing 51. The spool 54 comprises a piston member 54a and a rod member 54b extending coaxially downwardly from the piston member 54a. The piston member 54a is fitted in a cylinder bore 51c defined vertically in the housing 51 and closed by a cover 55, dividing the cylinder bore 51c into upper and lower cylinder chambers 52, 53. The rod member 54b is slidably fitted in a rod bore 51d defined in the housing 51 and extending coaxially downwardly from the cylinder bore 51c.

The rod member 54b has a recess 54e defined in a side surface thereof and including a tapered surface. A top position detecting switch 58 mounted on the housing 51 has a spool 58a projecting into the recess 54e. Upon the upward movement of the spool 54, the spool 58a is displaced laterally to the left by the tapered surface for enabling the switch 58 to detect whether the speed reduction ratio of the hydraulic motor M is minimized or not.

The upper and lower cylinder chamber 52, 53 are held in communication with the respective hydraulic lines 102, 104 through ports 51a, 51b respectively. The piston 54 is vertically moved under a hydraulic pressure acting on the piston member 54a which is determined by the pressure of working oil supplied via the hydraulic lines 102, 104, into the cylinder chambers 52, 53 and the pressure-bearing area of the piston member 54a that faces into the cylinder chamber 52, 53. The vertical movement of the spool 54 is transmitted through the link mechanism 40 to the spool 34 of the first ratio control servo unit 30 to move the spool 34 to the left or the right. Consequently, by controlling the hydraulic pressure supplied through the hydraulic lines 102, 104, the movement of the spool 34 of the first ratio control servo unit 30 can be controlled, and the piston can be moved to control the angel of the swash plate Mt of the hydraulic motor M to vary the displacement of thereof for the control of the speed reduction ratio. More specifically, when the spool 54 of the second ratio control sevo unit 50 is moved upwardly, the piston 52 of the first ratio control servo unit 30 is moved to the right to reduce the swash plate angle, thereby reducing the displacement of the hydraulic motor M to decrease the speed reduction ration.

The hydraulic pressure in the hydraulic line 102 connected to the upper cylinder chamber 52 via the port 51a is the hydraulic pressure discharged from the charging pump 10, as regulated by the charging pressure relief valve 12, and introduced via a hydraulic line 101 connected to the hydraulic line 102. The hydraulic pressure in the hydraulic line 104 connected to the lower cylinder chamber 53 via the port 51b is the hydraulic pressure supplied from a hydraulic line 103 branched off the hydraulic line 102 and having an orifice 103l, as controlled by the two solenoid valves 151, 152 with their duty cycle being controlled by the controller 100. The solenoid valve 151 serves to control, dependent on its controlled duty cycle, the rate of flow of the working oil from the hydraulic line 103 into the hydraulic line 104. The solenoid valve 152 is disposed between a hydraulic line 105 branched off the hydraulic line 104 and a hydraulic line 106 communicating with a drain via an orifice 106a for controlling the rate of flow of the working oil from the hydraulic line 104 into the drain dependent on the controlled duty cycle of the solenoid valve 152.

Therefore, the charging pressure as regulated by the charging pressure relief valve 12 and supplied via the hydraulic line 102 acts in the upper cylinder 52. The lower cylinder 53 is supplied with a hydraulic pressure from the hydraulic line 104 which is made lower than the charging pressure by the solenoid valves 151, 152. Since the pressure-bearing area of the piston member 54a facing into the upper cylinder chamber 52 is smaller than the pressure-bearing area of the piston member 54a facing into the lower cylinder chamber 53, the forces acting on the spool 54 due to the respective hydraulic pressure in the upper and lower cylinder chambers 52, 53 are brought into equilibrium when the hydraulic pressure in the lower cylinder chamber 53 is a balancing pressure Pl lower than the hydraulic pressure Pu in the upper cylinder chamber 52 (Pu>Pl). As a consequence, by controlling the hydraulic pressure to be supplied from the hydraulic line 104 into the lower cylinder chamber 53 to be higher than the balancing pressure Pl, the spool 54 can be moved upwardly to reduce the swash plate angle of the hydraulic motor M for decreasing the speed reduction ratio. Conversely, by controlling the hydraulic pressure to be supplied into the lower cylinder chamber 53 to be lower than the balancing pressure Pl, the spool member 54 can be moved downwardly to increase the swash plate angle for increasing the speed reduction ratio.

The solenoid valves 151, 152 are controlled in operation by a signal from the controller 100. Therefore, the signal from the controller 100 is effective in controlling the operation of the first and second ratio control servo units 30, 50, controlling the displacement of the hydraulic motor M, and controlling the speed reduction ratio.

Figure 3:
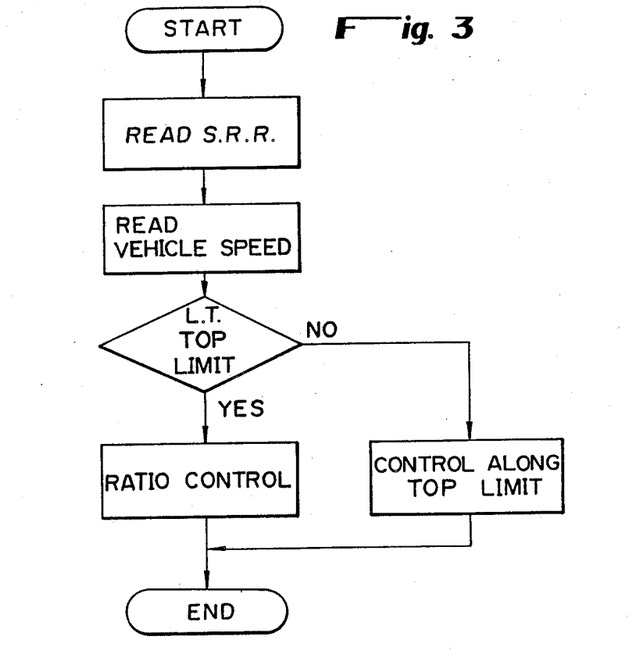
FIGS. 3 and 6 are flow charts of control sequences for controlling the speed reduction ratio.
Figure 4:
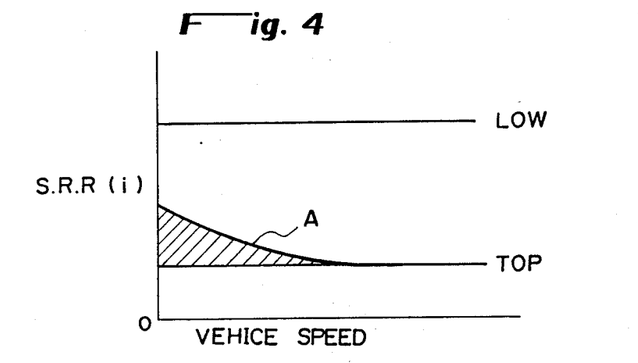
FIG. 4 is a graph showing the relationship between a speed reduction ratio and a vehicle speed.

The control of the speed reduction ratio with the controller 100 will be described with reference to the flowchart of FIG. 3 and with respect to FIG. 4.

First, a speed reduction ratio i and a vehicle speed V at a present time are read. Then, it is determined whether the speed reduction ratio i with respect to the vehicle speed V is greater (i.e., closer to the maximum speed reduction ratio of the line "LOW") than the top limit speed reduction ratio of the line "A" which is set greater than the minimum speed reduction ratio of the line "TOP" in a lower vehicle speed range. If the speed reduction ratio "i" is greater than the top limit ratio as indicated by the line A, then the speed reduction ratio is controlled in a normal control mode. If the speed reduction ratio is smaller than the top limit ratio as indicated by the line A, then the speed reduction ratio is controlled so as to coincide with the top limit ratio of the line A corresponding to the vehicle speed V. That is, if the speed reduction ratio "i" is in a hatched area in FIG. 4, then a speed reduction ratio on the top limit line A corresponding to the vehicle speed V is used.

Figure 5:
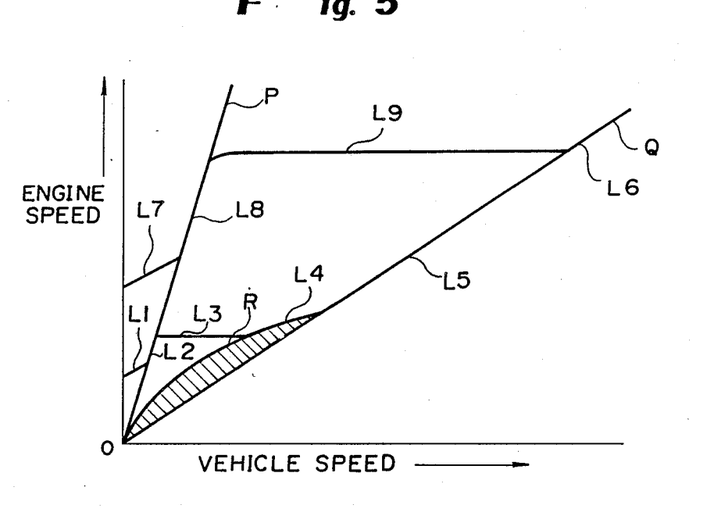
FIG. 5 is a graph showing running characteristics of a motor vehicle equipped with the continuously variable speed transmission.

With the speed reduction ratio thus controllled, the vehicle on which the continuously variable speed transmission is mounted has running characteristics as shown in FIG. 5. More specifically, conventional running characteristics allow the speed reduction ratio to be continuously varied between maximum and minimum speed reduction ratios indicated by the lines P, Q. According to the control of the present invention, however, a characteristic curve R (top limit speed reduction line) is added in a lower vehicle speed range, and the speed reduction ratio is controlled so as to be greater than the top limit ratio of the line R, so that no speed reduction ratio will be selected in a hatched area surrounded by the top limit line R and the minimum speed reduction ratio line Q. Therefore, in the lower vehicle speed range, the speed reduction ratio will not become too small. When the accelerator pedal is depressed for acceleration while the vehicle is running at a low vehicle speed, a large drive torque can be produced without any undesirable power shortage and engine knocking.

The manner in which the motor vehicle is started and runs under the above speed reduction ratio control will be described below with reference to FIG. 5. For starting the motor vehicle, the accelerator pedal is depressed to increase the opening of the throttle valve and the engine speed. Consequently a main clutch is engaged, and thereafter the vehicle speed is increased while equalizing the engine speed with a reference engine speed dependent on the throttle valve opening. For example, the vehicle speed is controlled to vary from L1 (the engagement of the main clutch) to L2 (an increase in the vehicle speed due to an increase in the engine speed at the maximum speed reduction ratio) to L3 (an increase in the vehicle speed by decreasing the speed reduction ratio while keeping the engine speed at a constant level) to L4 (an increase in the vehicle speed along the top limit speed reduction ratio line R) to L5, L6 (an increase in the vehicle speed due to an increase in the engine speed at the minimum speed reduction ratio). The above vehicle speed varying sequence from L1 to L6 is followed when the depression of the accelerator pedal is comparably slow. When the amount of depression of the accelerator pedal is quick, the speed reduction ration is controlled while the engine speed is high, to vary the vehicle speed from L7 to L8 to L9 to L6. The speed reduction ratio is minimized in a high vehicle speed range, and no speed increasing control is effected along the lower limit line R.

A process of calculating the speed reduction ratio for controlling the speed reduction ratio as described above will be described below. This process is effected by calculating the rate of change $di/dt$ of the speed reduction ratio.

The speed reduction ratio i {=(input speed)/(output speed)} is expressed by the following equation (1):

$$i = N / (C'*V) \tag{1}$$

where N is the engine rotational speed, V is the vehicle speed, and C' is a constant. The rate of change of the speed reduction ratio $di/dt$ is obtained by differentiating the equation (1) with time t, as follows:

$$di/dt = 1/(C'*V)*\{(dN/dt) - N/(C'*V))*(C'*dV/dt)\} \tag{2}$$

by replacing the rate of change $dN/dt$ of the engine speed with the rate of change $dNo/dt$ of the reference engine speed, the acceleration $dv/dt$ with a predicted acceleration $dVo/dt$, and putting $C' = 1/C$ in the, $$di/dt = \{-C*(N/V^2)*(dVo/dt)\} + \{C*(1/V)*(dNo/dt)\} \tag{3}$$

Therefore, the rate of change $di/dt$ of the speed reduction ratio is given as the sum of a component $dia/dt$ ($= -C* N/V^{2}* dVo/dt$) corresponding to the predicted acceleration $dVo/dt$ and a component $D_{iN}/dt$ ($= C * 1/V * dNo/dt$) corresponding to the rate of change $dNo/dt$ of the reference engine speed. The predicted acceleration $dVo/dt$ is obtained from the following equations (4) through (7):

The output power Pe of the engine E itself is expressed by:

$$Pe = Ru + Ra + Pa \tag{4}$$

where Ru is the resistance of the road, Ra is the resistance of air, and Pa is the reserved power of the engine E. From the equation (4), the reserved power of the engine E is given by:

$$Pa = Pe - (Ru + Ra) \tag{5}$$

The reserved engine power Pa can also be expressed by the equation (6):

$$Pa = (W + dW) * 1/g * dVo/dt * (V*10^3/60^2) * 1/75 \tag{6}$$

From the equations (5) and (6), we get $$dVo/dt = Pa * g * 60^2 * 75/\{(W + dW)*(V*10^3)\}$$

Thus, the predicted acceleration $dVo/dt$ can be calculated from the reserved power Pa of the engine E, which can be determined by the equation (5). The rate of change $dNo/dt$ of the reference engine speed can be obtained by calculating the difference $dN$ between the reference engine speed No corresponding to a parameter representing the driver's intention of acceleration or deceleration and the actual enging speed N, and searching a table or map of rates of change $dNo/dt$ of the reference engine speed which are related to values of the difference $dN$ in view of the driver's feeling as to the running of the motor vehicle and fuel consumption. The speed reduction ratio is controlled by controlling operation of the solenoid valves 151, 152 in order to obtain the basic rate of change $di/dt$ of the speed reduction ratio thus calculated.

The component $d_{iN}/dt$ of the basic rate of change $di/dt$ corresponding to the rate of change $dNo/dt$ of the reference engine speed is proportional to the reciprocal (1/V) of the vehicle speed. This indicates that to obtain the same increase in the engine speed by depressing the accelerator pedal for acceleration, a large rate of change of the speed reduction ratio is required when the vehicle speed is low that when the vehicle speed is high, and the increase in the engine speed when the vehicle speed is low tends to be slow. By controlling the speed reduction ratio so that it will not be too small in a lower vehicle speed range, it is possible to eliminate the slow increase in the engine speed when accelerating the motor vehicle at low vehicle speeds.

In the above description, the speed reduction ratio of the continuously variable speed transmission is detected, and controlled so as to be greater than the top limit speed reduction ratio line. The curve R defining the hatched area in FIG. 5 can be defined by the engine speed with respect to the vehicle speed. Therefore, the above process of controlling the speed reduction ratio may be effected by employing the reference engine speed as a control factor.

Figure 6:
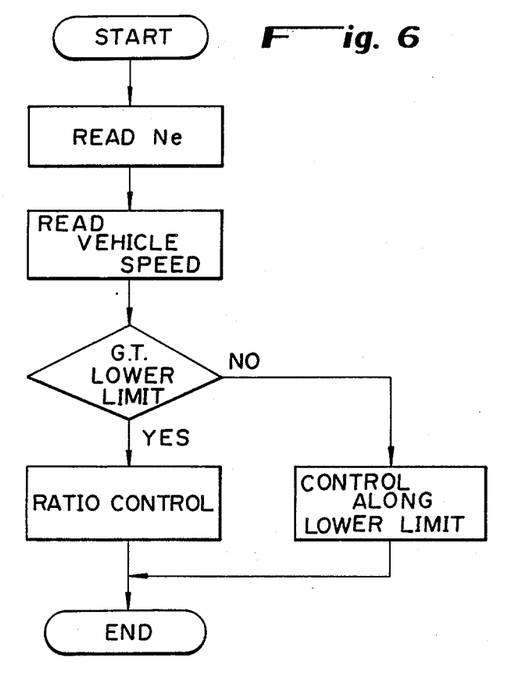
Figure 7:
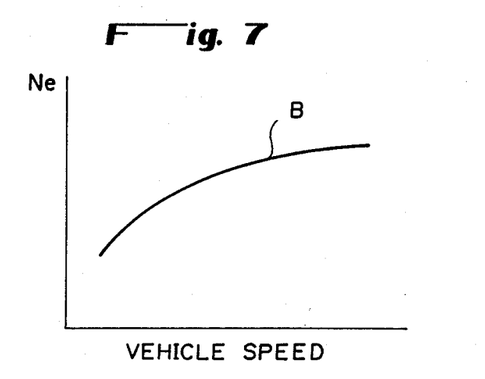
FIG. 7 is a graph showing the relationship between an engine rotational speed and a vehicle speed.

Such a control process will be described with reference to the flow chart of FIG. 6. In this control process, an engine speed Ne and a vehicle speed V at the present time are read, and then it is determined whether or not the engine speed Ne with respect to the vehicle speed V is higher than a low limit engine speed indicated by the line B as shown in FIG. 7. If the engine speed is higher than the low limit as shown by the line B, then the speed reduction ratio is controlled in a normal control mode. If the engine speed is lower than the low limit, then the speed reduction ratio is controlled so that the engine speed matches the low limit indicated by the line B corresponding to the vehicle speed V at the time. The low limit engine speed line B is selected to be the same as the curve R in FIG. 5. Therefore, the running of the motor vehicle is controlled as shown in FIG. 5.

In the above embodiment, the continuously variable speed transmission comprises a hydraulic pump and a hydraulic motor. However, the method of the present invention is not limited to continuously variable speed transmissions of the illustrated type, but may be applied to continuously variable speed transmission, of other designs. The arrangement for controlling the speed reduction ratio is not limited to the illustrated electrohydraulic system including the electric controller for controlling the solenoid valves to operate the servo units, but may be a system for generating a hydraulic pressure commensurate with the opening of a throttle valve to operate the servo units under the generated pressure.

With the present invention, as described above, the speed reduction ratio is controlled so as not to be smaller than the top limit speed reduction ratio in a lower vehicle speed range. Consequently, it is possible to quickly increase the engine speed when accelerating the motor vehicle in a lower vehicle speed range in which a relatively large rate of change of the speed reduction ratio is required and an increase in the engine speed upon acceleration would otherwise tend to be slow. Therefore, engine knocking and power shortage are prevented from occurring even when accelerating the motor vehicle in a lower vehicle speed range.

The invention being thus described, it will be obvious that the same may be varied in many way. Such variations are not to be regarded as a departure from the spirit and scope of the invention, and all such modifications as would be obvious to one skilled in the art are intended to be included within the scope of the following claims.

What is claimed is:

1. A method of controlling a speed reduction ratio of a continuously variable speed transmission by continuously varying the speed reduction ratio in a range between a maximum speed reduction ratio and a minimum speed reduction ratio, said method comprising the steps of:
    setting a top limit speed reduction ratio corresponding to a speed of a vehicle and being higher than said minimum speed reduction ratio in a low vehicle speed range; and
    controlling the speed reduction ratio in a range between said maximum speed reduction ratio and said top limit speed reduction ratio in said low vehicle speed range.

2. A method as defined in claim 1, wherein a low limit engine speed corresponding to said top limit speed reduction ratio in said low vehicle speed range is set and the speed reduction ratio is so controlled that an actual engine speed is higher than said low limit engine speed, thereby keeping the speed reduction ratio in a range between said maximum speed reduction ratio and said top limit speed reduction ratio.

3. A method as defined in claim 1, wherein said continuously variable speed transmission has a hydraulic pump coupled to said engine, a hydraulic motor coupled to an output shaft, and a closed hydraulic circuit hydraulically interconnecting said hydraulic pump and said hydraulic motor, and wherein said speed reduction ratio is controlled by variably controlling displacement of at least one of said hydraulic pump and said hydraulic motor.

4. A method of controlling a speed reduction ratio of a continuously variable transmission by continuously varying the speed reduction ratio in a range between a maximum speed reduction ratio and a minimum speed reduction ratio, said method comprising the steps of,
    setting a top limit speed reduction ratio corresponding to a speed of a vehicle and being higher than said minimum speed reduction ratio in a low vehicle speed range, and
    if the speed of said vehicle is within said low vehicle speed range, then controlling the speed reduction ratio in a range between said maximum speed reduction ratio and said top limit speed reduction ratio, and if the speed of said vehicle is not within said low vehicle speed range, then controlling the speed reduction ratio in a range between said maximum speed reduction ratio and said minimum speed reduction ratio.

5. A method of controlling a speed reduction ratio according to claim 4, further comprising the steps of,
    setting a low limit engine speed corresponding to said top limit speed reduction ratio in said low vehicle speed range, and
    if the speed of said vehicle is within said low vehicle speed range, then controlling the speed reduction ratio so that the speed of said engine is not less than said low limit engine speed.

6. A method of controlling a speed reduction ratio of a continuously variable transmission of the type having a hydraulic pump and a hydraulic motor interconnected by a closed hydraulic circuit, said hydraulic pump being coupled to an engine of a vehicle for driving said pump, said hydraulic motor being coupled to at least one wheel of said vehicle for driving said vehicle, at least one of said hydraulic pump and said hydraulic motor being of the variable displacement type, wherein said continuously variable transmission is controlled by continuously varying the speed reduction ratio in a range between a maximum speed reduction ratio and a minimum speed reduction ratio, said method comprising the steps of,
    setting a top limit speed reduction ratio corresponding to a speed of a vehicle and being higher than said minimum speed reduction ratio in a low vehicle speed range, and
    if the speed of said vehicle is within said low vehicle speed range, then controlling the speed reduction ratio in a range between said maximum speed reduction ratio and said top limit speed reduction ratio, and if the speed of said vehicle is not within said low vehicle speed range, then controlling the speed reduction ratio in a range between said maximum speed reduction ratio and said minimum speed reduction ratio.

7. A method of controlling a speed reduction ratio in a continuously variable transmission by continuously varying the speed reduction ratio in a range between a maximum speed reduction ratio and a minimum speed reduction ratio, said method comprising the steps of,
    reading the speed reduction ratio of said transmission,
    reading a speed of a vehicle in which said transmission is carried, setting a top limit speed reduction ratio corresponding to a speed of said vehicle and being higher than said minimum speed reduction ratio in a low vehicle speed range, determining whether said speed reduction ratio is less than said top limit speed reduction ratio, and if said speed reduction ratio is less than said top limit speed reduction ratio and the vehicle speed is within said low vehicle speed range, then controlling the speed reduction ratio so as to coincide with said top limit speed reduction ratio.

8. A method of controlling a speed reduction ratio in a continuously variable transmission by continuously varying the speed reduction ratio in a range between a maximum speed reduction ratio and a minimum speed reduction ratio, said method comprising the steps of, reading an engine speed of an engine in a vehicle in which said transmission is carried, reading a speed of said vehicle, setting a low limit engine speed corresponding to a top limit speed reduction ratio that is higher than said minimum speed reduction ratio in a low vehicle speed range, determining whether said engine speed is less than said low limit engine speed, and if said engine speed is lower than said low limit engine speed and the vehicle speed is within said low vehicle speed range, then controlling the speed reduction ratio to cause the engine speed to coincide with said low limit engine speed.

* * * * *